United States Patent Office 3,686,216
Patented Aug. 22, 1972

3,686,216
BENZOTHIOPHENE 1,1-DIOXIDE DERIVATIVES
AND METHOD OF PREPARING SAME
Douglas I. Relyea, Pompton Plains, N.J., assignor to
Uniroyal, Inc., New York, N.Y.
No Drawing. Filed Jan. 23, 1969, Ser. No. 793,561
Int. Cl. C07d 63/22
U.S. Cl. 260—330.5
13 Claims

ABSTRACT OF THE DISCLOSURE

Novel benzothiophene 1,1-dioxide derivatives have been found useful as fungicides and bactericides. They are prepared by reacting benzothiophene 1,1-dioxide with an appropriate organic sulfenyl chloride (RSCl) and then dehydrohalogenating the reaction product with a strongly basic reagent to produce the 2-(R thio) benzo [b] thiophene-1,1-dioxide derivatives; isomerization of these derivatives to their 3-(R thio) isomers is accomplished by heating with a strongly basic reagent; the (R thio) derivatives also can be oxidized to the sulfonyl compounds—(RSO$_2$).

This invention relates to new compositions of matter and their preparation. These compounds are useful as fungicides and bactericides and may be represented by the following formulas:

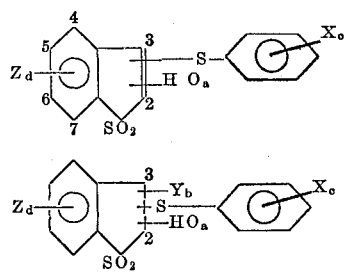

(I)

(II)

The structural representation of Formula I is meant to indicate that the $$\left[-\underset{O_a}{\overset{}{S}}-\underset{}{\bigcirc}X_c\right] \text{ or } H$$

substituent can be at either the 2 or 3 position of the benzothiophene-1, 1-dioxide ring system. Similarly, substituent Y in Formula II can be found in the 2 and/or 3 positions of the compound.

X is halogen, nitro, alkyl, alkoxy, haloalkyl, carboxy, and sulfonyl halide; Y is independently selected from hydrogen, lower alkyl, lower alkoxy, halo and hydroxy; Z is alkyl, alkoxy, halo, carboxy, haloalkyl and nitro; $a$, $b$, $c$ and $d$ are independently valued: $a$ may be 0 or 2 (but if $a=2$ and the 3 position has $\{SO_a\}$, then $Y_2$ may not both be hydrogen); $b$ is 2; $c$ may be 0 or an integer from 1 to 5 and $d$ may be 0 or an integer from 1 to 4.

Examples of X are methyl, dimethyl, ethyl, isopropyl, n-butyl, t-butyl, hexyl, octyl, methoxy, propoxy, chloro, dichloro, bromo, nitro.

Additional examples of Y and of Z are methyl, ethyl, propyl, t-butyl, methoxy, chloro, bromo, iodo and fluoro.

A fully detailed description of the fungicidal and bactericidal activity of these compounds is contained in copending application of Von Schmeling et al., Ser. No. 793,562, filed of even date herewith and assigned to the assignee of the instant application.

The aforesaid compositions of matter are prepared by reactions which are of surprising efficacy. For example, sulfenyl chloride can be added to the electron-poor double bond of benzothiophene, 1,1-dioxide to form such compounds as 2 - phenylthio-3-chloro-2,3-dihydrobenzo[b]-thiophene-1,1-dioxide. Oxidation of this compound produces another compound of the invention, namely 3-chloro-2-phenylsulfonyl-2, 3 - dihydrobenzothiophene-1, 1-dioxide.

This reaction is conveniently carried out at temperatures of 0 to 150°, preferably 20 to 75° C., in a solvent which is inert to sulfenyl halides and is preferably acetic acid, but which may also be chloroform, carbon tetrachloride, 1,2-di-chloromethane or 1,2-dichlorobenzene.

The 2-(phenylthio)-3-chloro - 2,3 - dihydrobenzo[b]-thiophene-1,1-dioxide can be readily dehydrohalogenated by using an equivalent amount of sodium hydroxide, potassium hydroxide, pyridine, 1,4-diazabicyclo [2.2.2] octane or other such strongly basic reagent. Reaction temperatures are in the range of 15 to 100° C., preferably 30 to 75° C. and the solvent is ethanol, methanol, dioxane or other suitable organic solvent. The reaction time is 5 minutes to 5 hours, preferably 15 to 30 minutes, at the end of which time the reaction mixture is made acidic by the addition of hydrochloric or other mineral acid.

The resulting 2-(phenylthio)benzo[b]-thiophene - 1,1-dioxide may be oxidized by using from two to four equivalents of hydrogen peroxide in an organic solvent miscible with water, preferably acetic acid, at temperatures of 25 to 125° C., preferably 85 to 110° C., with reaction time of 2 minutes to 4 hours, preferably 10 to 30 minutes, to form the phenyl sulfonyl compound.

Still another process concerns the rearrangement of 2 - (phenylthio)benzo[b] - thiophene type compounds to their 2-phenylthio isomers. This latter isomer may be prepared by either of the following reactions:

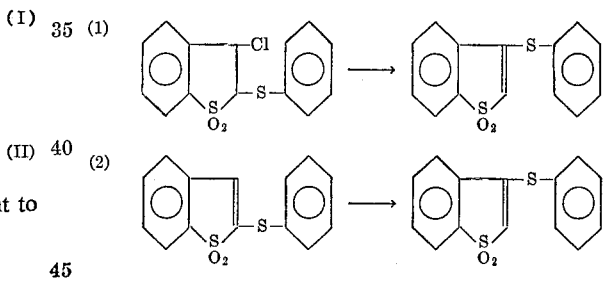

The above specific reactions, of course, being only representative of the broad class of reactions which fall within the scope of the instant invention. The 3-phenylthio compound may be readily oxidized into the 3-phenyl sulfonyl compounds of the invention in a manner analogous to that of the 2-phenylthio isomers.

Thus, it should be understood that these methods are equally applicable to other arylthio compounds (e.g. benzylthio, naphthylthio), and to straight or branched chain compounds (e.g. alkyl, alkoxy) and to cyclic compounds as well (e.g. heterocyclic, cycloalkyl).

Reaction (1) is carried out with an excess of a strongly basic reagent, such as sodium hydroxide, potassium hydroxide, pyridine, 1,4-diazabicyclo [2.2.2] octane and the like, at a temperature from 0° to 150° C., preferably 30–50° C., in a solvent such as ethyl alcohol, dioxane, isopropanol, ethylene glycol or any of these diluted with water. In this reaction the starting material is both dehydrohalogenated and isomerized.

In reaction (2), only isomerization occurs. Here only catalytic amounts (1–50 mole percent based on the phenylthiobenzothiophene 1,1-dioxide) of the strongly basic reagent are required; the preferred amount being 5 to 25 mole percent.

In order to illustrate the invention more fully attention is directed to the following examples:

EXAMPLE 1

The preparation of trans-3-chloro-2-phenylthio 2,3-dihydrobenzothiophene 1,1-dioxide A solution of 300 g. of benzothiophene 1,1-dioxide in 1500 ml. of glacial acetic acid was warmed to 55° C. To the clear solution was added the benzene-sulfenyl chloride obtained by chlorinolysis of 205 g. of thiophenol at 0–5° in one liter of carbon tetrachloride for six hours followed by evaporation of the excess chlorine and solvent. An exotherm of 58° C. occurred. The red solution was warmed to 73° C. and then allowed to cool to room temperature while standing sixteen hours. During this time the red color of the benzenesulfenyl chloride disappeared, leaving a yellow solution. The solution was diluted with 61% of water and extracted with three 500-ml. portions of chloroform. The extracts were combined, washed with two 300-ml. portions of water, dried over magnesium sulfate and evaporated down to give 465 g. (83%) of cured product, M.P. 99–104°. Pure trans-3-chloro-2-phenylthio - 2,3 - dihydrobenzothiophene 1,1-dioxide, M.P. 104–106°, is obtained by recrystallization from bis(2-methoxyethyl)ether.

Analysis.—Calcd. for $C_{14}H_{11}ClO_2S_2$ (percent): C, 54.11; H, 3.57; Cl, 11.41; S, 20.64. Found (percent): C, 53.98; H, 3.43; Cl, 11.18; S, 21.19.

Examples 2–8 illustrate other trans-3-chloro-2-phenylthio-2,3-dihydrobenzothiophene 1,1-dioxides that were prepared using the method of Example 1. The starting materials for Examples 2 to 7 were benzothiophene 1,1-dioxide and the appropriately substituted benzene sulfonyl chloride. In Example 8, 3-methylbenzothiophene 1,1-dioxide and benzene sulfenyl chloride were used as the starting materials. The generic formula of these dioxides is as follows:

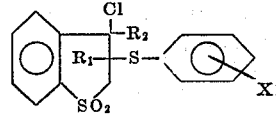

| | | | | M.P. | Yield, | Empirical | Calculated | | | | Found | | | |
|---|---|---|---|---|---|---|---|---|---|---|---|---|---|---|
| Example | X | $R_1$ | $R_2$ | (° C.) | percent | formula | C | H | Cl | S | C | H | Cl | S |
| 2 | p-Cl | H | H | 89–90 | 64 | $C_{14}H_{10}Cl_2O_2S_2$ | 48.70 | 2.92 | 20.54 | 18.57 | 48.86 | 3.19 | 20.00 | 20.38 |
| 3 | p-Br | H | H | 119–120 | 45 | $C_{14}H_{10}BrClO_2S_2$ | 43.15 | 2.59 | a 29.60 | 16.46 | 43.13 | 3.08 | a 30.66 | 16.00 |
| 4 | p-$NO_2$ | H | H | 177–178 | 62 | $C_{14}H_{10}ClNO_4S_2$b | 47.26 | 2.83 | 9.96 | 18.02 | 47.46 | 3.13 | 9.96 | 18.09 |
| 5 | o-$CH_3$ | H | H | 107–108 | 86 | $C_{15}H_{13}ClO_{10}O_2S_2$ | 55.46 | 4.03 | 10.91 | 19.74 | 55.56 | 4.26 | 11.02 | 19.55 |
| 6 | m-$CH_3$ | H | H | 110–111 | 80 | $C_{15}H_{13}ClO_2S_2$ | 55.46 | 4.03 | 10.91 | 19.74 | 54.25 | 3.71 | 11.91 | 19.21 |
| 7 | p-$(CH_3)_3$C | H | H | 82–84 | 27 | $C_{18}H_{19}ClO_2S_2$ | 58.92 | 5.22 | 9.66 | 17.48 | 58.98 | 5.23 | 9.25 | 17.48 |
| 8 | H | H | H | 103–107 | 37 | $C_{15}H_{13}ClO_2S_2$ | 55.46 | 4.03 | 10.91 | 19.74 | 55.53 | 3.99 | 10.68 | 19.51 | a Total halogen (percent bromine plus chlorine).    b Percent N: Calcd., 3.94; found, 4.61.

EXAMPLE 9

The preparation of 2-(phenylthio)benzothiophene 1,1-dioxide

A 31-g. portion of 3-chloro-2-phenylthio-2,3-dihydrobenzothiophene 1,1-dioxide was dissolved in 200 ml. of absolute ethanol by warming to reflux. A solution of 4 g. of sodium hydroxide in 10 ml. of water was added dropwise in five minutes. The heat of reaction maintained gentle reflux during the addition. After another five minutes 1.2 ml. of concentrated hydrochloric acid was added. The acidic mixture was filtered to remove sodium chloride and allowed to cool to room temperature (25° C.). Filtration after 16 hours gave 18.8 g. (69%) of product, M.P. 92.0–93.5° C. Recrystallization from ethanol gave pure 2-(phenylthio)benzothiophene 1,1-dioxide, M.P. 96–97° C.

Analysis.—Calcd. for $C_{14}H_{10}O_2S_2$ (percent): C, 61.29; H, 3.67; S, 23.37. Found (percent): C, 61.29; H, 3.58; S, 23.17.

Examples 10–15 illustrate other (2-phenylthio)benzothiophene 1,1-dioxides that were prepared using the method of Example 9 starting with the appropriately substituted 3-chloro 2-phenylthio-2, 3-dihydrobenzothiophene 1,1-dioxide The generic formula of these dioxides is as follows:

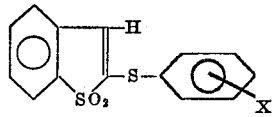

| | | M.P. | Yield, | Empirical | Calculated | | | Found | | |
|---|---|---|---|---|---|---|---|---|---|---|
| Example | X | (° C.) | percent | formula | C | H | S | C | H | S |
| 10 | p-Cl | 156–158 | 58 | $C_{14}H_9ClO_2S_2$a | 54.45 | 2.94 | 20.77 | 55.41 | 3.07 | 20.33 |
| 11 | p-Br | 178–179 | 55 | $C_{14}H_9BrO_2S_2$b | 47.60 | 2.57 | 18.15 | 48.58 | 2.51 | 17.66 |
| 12 | p-$NO_2$ | 160–162 | 59 | $C_{14}H_9NO_4S_2$c | 52.65 | 2.84 | 20.08 | 54.92 | 3.10 | 20.04 |
| 13 | o-$CH_3$ | 124–125 | 69 | $C_{15}H_{12}O_2S_2$ | 62.47 | 4.19 | 22.24 | 62.14 | 4.21 | 21.78 |
| 14 | p-$(CH_3)_3C$ | 114–115 | 45 | $C_{18}H_{18}O_2S_2$ | 65–42 | 5.49 | 19.41 | 65.14 | 5.56 | 18.80 |
| 15 | m-$CH_3$ | 106–107 | 55 | $C_{15}H_{12}O_2S_2$ | 62.47 | 4.19 | 22.24 | 62.39 | 4.09 | 22.07 | a Percent Cl: Calcd., 11.48; found, 11.49.
b Percent Br: Calcd., 22.62; found, 21.94.
c Percent N: Calcd., 4.39; found, 4.04.

EXAMPLE 16

The preparation of 2-(phenylsulfonyl)benzothiophene 1,1-dioxide

A solution of 27.4 g. of 2-(phenylthio)benzothiophene 1,1-dioxide in 130 ml. of acetic acid at 45° C., was treated with 40 ml. of 30% aqueous hydrogen peroxide and warmed to 85° C. Reflux occurred accompanied by an exotherm to 112° C. After fifteen minutes the reaction mixture was diluted with 100 ml. of water and allowed to cool. Filtration gave 12 g. (39%) of colorless granules M.P. 181–182° C.

Analysis.—Calcd. for $C_{14}H_{10}O_2S_2$ (percent): C, 54.88; H, 3.39; S, 20.93; O, 20.89. Found (percent): C, 55.29; H, 2.98; S, 20.95; O, 21.25.

EXAMPLE 17

The preparation of 3-(phenylthio)benzothiophene 1,1-dioxide demonstrates the simultaneous dehydrochlorination and rearrangement of the product of Example 1

A solution of 31 g. of trans-3-chloro-2-phenylthio-2,3- dihydrobenzothiophene 1,1-dioxide in 200 ml. of ethanol was heated just to boiling. Addition of 4 g. of sodium hydroxide in 10 ml. of water during five minutes maintained gentle reflux. The reaction mixture was filtered to remove sodium chloride. The clear filtrate, which was slightly basic was allowed to cool to 25° C., and to stand for sixteen hours. Filtration gave 16.3 g. (59%) of 3-(phenylthio)benzothiophene 1,1-dioxide, M.P. 164–165° C.

Analysis.—Calcd. for $C_{14}H_{10}O_2S_2$ (percent): C, 61.29; H, 3.67; O, 11.66; S, 23.37. Found (percent): C, 61.12; H, 3.55; O, 11.98; S, 23.18.

This product is distinguishable from 2-(phenylthio)benzothiophene 1,1-dioxide, M.P. 96–96° C., on the basis of a mixed M.P. (84–145° C.) and the infrared absorption maxima listed below:

| Vibration mode | 2-phenylthio isomer, cm.$^{-1}$ | 3-phenylthio isomer, cm.$^{-1}$ |
|---|---|---|
| Aromatic C=C | 1,575 | 1,585 |
| Do | 1,540 | 1,530 |
| S-O | 1,295 | 1,290 |
| S-O | 1,145 | 1,170 |

A solution of 20.5 g. of 3-(phenylthio)benzothiophene 1,1-dioxide in 130 ml. of glacial acetic acid and 35 ml. of 30% aqueous hydrogen peroxide was heated at 89–90° C., for two hours, diluted with 125 ml. of water and allowed to cool. Filtration gave 14.5 g. (64%) of 3-(phenylthio)benzothiophene 1,1-dioxide, M.P. 166.5–167.5° C.; M.P. mixed with 2-(phenylsulfonyl)benzothiophene 1,1-dioxide, 158–210° C.

Analysis.—Calcd for $C_{14}H_{10}O_4S_2$ (percent): C, 54.88; H, 3.29; O, 20.89; S, 20.93. Found (percent): C, 55.22; H, 3.49; O, 21.23; S, 20.66.

Example 25 illustrates how certain physical measurements can be used to distinguish the substituted 2-(phenyl)benzothiophene 1,1-dioxides from the corresponding 3-phenylthio)-isomers.

It has been determined that the substituted 2-(phenylthio)-isomers—using the numbering scheme above described—may be distinguished from their corresponding substituted 3-(phenylthio)-isomers by the fact that in each isomer pair the 2-(phenylthio)-isomer has: (1) the lower melting point, and (2) the greater spacing between the Examples 18–21 illustrate other 3-(phenylthio)benzothiophene 1,1-dioxides that were prepared by the method of Example 17. These dioxides have the following generic formula:

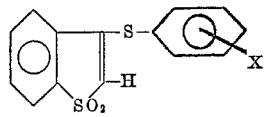

| Example | X | M.P. (°C.) | Empirical formula | Calculate C | Calculate H | Calculate S | Found C | Found H | Found S |
|---|---|---|---|---|---|---|---|---|---|
| 18 | p-Cl | 200–204 | $C_{14}H_9ClO_2S_2$ a | 54.45 | 2.94 | 20.77 | 54.57 | 2.96 | 20.64 |
| 19 | p-Br | 215–217 | $C_{14}H_9BrO_2S_2$ b | 47.60 | 2.57 | 18.15 | 47.67 | 2.57 | 18.12 |
| 20 | p-(CH$_3$)$_3$C | 139–141 | $C_{18}H_{18}O_2S_2$ | 65.42 | 5.49 | 19.41 | 65.76 | 5.55 | 18.74 |
| 21 | o-CH$_3$ | 194–195 | $C_{15}H_{12}O_2S_2$ | 62.47 | 4.19 | 22.24 | 62.59 | 4.20 | 21.41 | a Percent Cl: Calcd., 11.48; found, 11.46.
b Percent Br: Calcd., 22.62; found, 22.13.

Example 22 illustrates the isomerization of 2-(phenylthio)benzothiophene 1,1-dioxide to 3-(phenylthio)benzothiophene 1,1-dioxide.

two infrared absorption maxima assigned to the sulfone group.

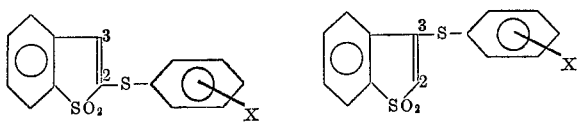

| X Group | Position of phenylthio substituent on fused ring | M.P. (° C.) | $\nu$S-O asym (cm.$^{-1}$) | $\nu$S-O sym (cm.$^{-1}$) | Difference $\nu_{asym-sym}$ (cm.$^{-1}$) |
|---|---|---|---|---|---|
| o-CH$_3$ | 2 | 124–125 | 1,305 | 1,150 | 155 |
| o-CH$_3$ | 3 | 194–195 | 1,290 | 1,170 | 120 |
| p-Cl | 2 | 156–158 | 1,295 | 1,150 | 145 |
| p-Cl | 3 | 203–204 | 1,285 | 1,165 | 120 |
| p-Br | 2 | 178–179 | 1,290 | 1,145 | 145 |
| p-Br | 3 | 215–217 | 1,285 | 1,166 | 119 |
| p-(CH$_3$)$_3$C | 2 | 114–115 | 1,297 | 1,144 | 153 |
| p-(CH$_3$)$_3$C | 3 | 139–141 | 1,288 | 1,170 | 118 |
| H | 2 | 96–97 | 1,296 | 1,145 | 150 |
| H | 3 | 164–165 | 1,290 | 1,170 | 120 |

A solution of 2 g. of 2-(phenylthio)benzothiophene 1,1-dioxide in 20 ml. of hot ethanol was treated with 0.3 g. of sodium hydroxide in 1 ml. of water. The addition of the base cause the appearance of a yellow-brown color. The basic mixture was allowed to cool. Filtration gave 1.5 g. (75%) of 3-(phenylthio)benzothiophene 1,1-dioxide as light yellow granules, M.P. 164.2–166.6° C.

EXAMPLE 23

Using the method of Example 22, 2-(o-tolythio)benzothiophene 1,1-dioxide was isomerized in 69% yield to 3-(o-tolyl)benzothiophene 1,1-dioxide, M.P. 193–194° C.; mixed melting point with the product of Example 21, 193–194° C.

Example 24 illustrates the preparation of 3-(phenylsulfonyl)benzothiophene 1,1-dioxide.

These compounds or derivatives, although they may occasionally be used by themselves, will normally be employed in a composition which comprises the active compound of this invention in association with an acceptable vehicle. The term "vehicle" is used herein to denote the wide variety of carriers, surfactants, extenders, or diluents, which may find service in compositions containing compounds or derivatives of this invention, and is qualified by the term "acceptable" only in that it excludes any possibility that the nature of the composition, considered in relation to the route by which it is intended to be administered, or the use to which it is to be put, could be harmful rather than beneficial. The choice of a suitable mode of presentation for any desired administration or application is completely within the competence of persons skilled in the art. Thus, where it is desired to protect crops from attack various fungi and bacteria, the chemicals of the invention can be used with common agricultural vehicles; similarly, where pharmaceutical use is intended, pharmaceutically acceptable vehicles will be employed.

Having thus described my invention, what I claim and desire to protect by Letters Patent is:

1. Trans-3-chloro-2-phenylthio-2,3 - dihydrobenzothiophene-1,1-dioxide.
2. 2-(4-nitrophenylthio)benzothiophene-1,1-dioxide.
3. 3-chloro-2-phenylsulfonyl - 2,3 - dihydrobenzothiophene-1,1-dioxide.
4. 2-(4-bromophenylthio)benzothiophene-1,1-dioxide.
5. 2-(4-chlorophenylthio)benzothiophene-1,1-dioxide.
6. 3-chloro-2-(4-nitrophenylthio) - 2,3 - dihydrobenzothiophene-1,1-dioxide.
7. A method of preparing a chemical of the formula

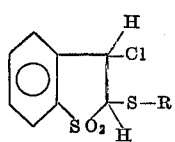

wherein R is selected from the group consisting of alkyl, alkoxy, aryl, alkaryl, alkoxyaryl, cycloalkyl, and the halo and nitro derivatives thereof, which comprises reacting benzothiophene-1,1-dioxide with the appropriate sulfenyl chloride RSCl in an inert solvent at a temperature from 0 to 150° C.

8. A method of preparing a chemical of the formula:

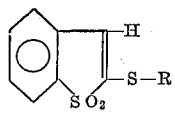

wherein R is selected from the group consisting of alkyl, alkoxy, aryl, alkaryl, alkoxyaryl, cycloalkyl, and the halo and nitro derivatives thereof, which comprises reacting the product of claim 7 with an equivalent amount of a strongly basic reagent in an inert solvent between 15 to 100° C., and then adding acid to render the solution acidic.

9. The method of claim 8 wherein said strongly basic reagent is selected from the group consisting of sodium hydroxide, potassium hydroxide, pyridine, 1,4-diazobicyclo [2.2.2] octane and the like.

10. A method of preparing a chemical of the formula:

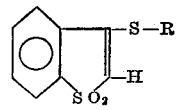

wherein R is selected from the group consisting of alkyl, alkoxy, aryl, alkaryl, alkoxyaryl, cycloalkyl, and the halo and nitro derivatives thereof, which comprises reacting the product of claim 7 with an amount of strongly basic reagent in excess of an equivalent amount in an inert solvent between 0° and 150° C.

11. The method of claim 10 wherein said strongly basic reagent is selected from the group consisting of sodium hydroxide, potassium hydroxide, pyridine, 1,4-diazobicyclo [2.2.2] octane and the like.

12. A method of preparing a chemical of the formula

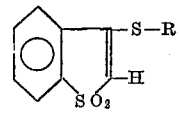

wherein R is selected from the group consisting of alkyl, alkoxy, aryl, alkaryl, alkoxyaryl, cycloalkyl, and the halo and nitro derivatives thereof, which comprises reacting the product of claim 8 with a catalytic amount varying from 1 to 50 mole percent (based on said chemical) of a strongly basic reagent in an inert solvent at a temperature from 0° to 150° C.

13. The method of claim 12 wherein said strongly basic reagent is selected from the group consisting of sodium hydroxide, potassium hydroxide, pyridine, 1,4-diazobicyclo [2.2.2] octane and the like.

References Cited

UNITED STATES PATENTS

| | | | |
|---|---|---|---|
| 2,557,673 | 6/1951 | McKellin, et al. | 260—330.5 |
| 2,976,297 | 3/1961 | Bluestone | 260—332.1 |

OTHER REFERENCES

Bordwell et al.: Jacs 76: 3637–9 (July 1954).
Mustafa et al.: Jacs 79; 3500–2 (July 1957).
Bordwell et al.: Jacs 82; 2878–81 (June 1960).

HENRY R. JILES, Primary Examiner

C. M. SHURKO, Assistant Examiner

U.S. Cl. X.R.

424—275